(12) United States Patent
Du (10) Patent No.: US 11,219,189 B2
(45) Date of Patent: Jan. 11, 2022

(54) THREE-PIECE NESTING CAT LITTER DEVICE

(71) Applicant: Tiffany Du, Garden Grove, CA (US)

(72) Inventor: Tiffany Du, Garden Grove, CA (US)

(*) Notice: Subject to any disclaimer, the term of this patent is extended or adjusted under 35 U.S.C. 154(b) by 174 days.

(21) Appl. No.: 16/846,084

(22) Filed: Apr. 10, 2020

(65) Prior Publication Data

US 2020/0323166 A1    Oct. 15, 2020

Related U.S. Application Data

(60) Provisional application No. 62/833,028, filed on Apr. 12, 2019.

(51) Int. Cl.
*A01K 1/01* (2006.01)
*A01K 1/00* (2006.01)

(52) U.S. Cl.
CPC .......... *A01K 1/0107* (2013.01); *A01K 1/0064* (2013.01)

(58) Field of Classification Search
CPC ................................ A01K 1/01; A01K 1/0064
USPC .................... 119/161, 162, 163, 165
See application file for complete search history.

(56) References Cited

U.S. PATENT DOCUMENTS

| 5,168,834 | A | * | 12/1992 | Buschur | A01K 1/0114 119/166 |
| 2006/0196439 | A1 | * | 9/2006 | Chilcoat | A01K 1/0114 119/165 |
| 2015/0020743 | A1 | * | 1/2015 | Bauer | A01K 1/0107 119/166 |
| 2016/0057968 | A1 | * | 3/2016 | Chandler | A01K 1/0272 119/497 |
| 2016/0165831 | A1 | * | 6/2016 | Adams | A01K 1/0125 119/170 |

* cited by examiner

*Primary Examiner* — Yvonne R Abbott-Lewis
(74) *Attorney, Agent, or Firm* — Richard D. Clarke (57) ABSTRACT

Provided is a Three-Piece Nesting Cat Litter Device constructed of an upper top cover section, a middle interior insert section and a lower bottom tray section with the middle interior insert section having a shelf ledge to support an inserted non-stick paper, and a swinging flapper door for entry. Air filter odor eliminator sections are located on the door, the walls or the top surface of the top section. A liner bag is placed in the lower bottom tray section. A sheet of non-stick paper is placed in the insert section with cat litter being placed upon the non-stick paper. For cleaning, the middle interior insert section is raised and the non-stick paper and used cat litter material drops by gravity into the plastic bag to be disposed of quickly and conveniently without creating dust and odors associated with changing used cat litter.

20 Claims, 7 Drawing Sheets

THREE-PIECE NESTING CAT LITTER DEVICE

FIELD OF THE INVENTION

This application relates to a Three-Piece Nesting Cat Litter Device. More particularly, to a device comprising three sections, namely, a round or rectangular upper section, a round or rectangular middle internal insert frame section and a round or rectangular lower section which supports a plastic bag therein. The round or rectangular middle internal insert frame section includes a rim edge to support an optional paper insert and contains the product used as a desiccant or drying agent commercially called cat litter, to be used in most cat litter devices by pet cats for defecating.

BACKGROUND OF THE INVENTION

Various products have been proposed in the past for providing adequate defecation areas for cats, but most eventually create bad odors. Most cat litter products use a desiccant that is a hygroscopic substance commercially called cat litter to absorb the moisture and dry the solids, but that often takes time with continuous maintenance and their devices often have to be located in the most out of the way places as possible. Many people have more than one cat for their companionship and that can be a problem keeping homes sanitary and clean smelling. A lot of people keep their cats indoors all the time because they do not want them to stray or be injured. Numerous products try to have the solids filtered out and reuse the cat litter but it can still carry the bad odors from the feline urine into the home's living areas.

Numerous innovations for the cat litter devices have been provided in the prior art that are described as follows. Even though these innovations may be suitable for the specific individual purposes to which they address, they differ from the present design as hereinafter contrasted. The following is a summary of those prior art patents most relevant to this application at hand, as well as a description outlining the difference between the features of the present Three-Piece Nesting Cat Litter Device and the prior art.

U.S. Pat. No. 4,505,226 of Greg A. Carlson describes a litter-cleaning animal litter box comprised of two substantially identical nest-ably stacked animal litter receptacles, with aperture means at their bottoms sized to permit the passage of litter but retain solid waste. A false bottom, to which wetted litter adheres, is fitted into each receptacle. Litter is placed into the upper receptacle-false bottom combination. A retaining edge that keeps the cat from scratching litter from the box when instinctively digging and covering is press fitted onto the peripheral shoulder of the upper receptacle. The upper receptacle-false bottom combination serves as a litter and waste holding means. The lower receptacle-false bottom combination serves as a strained litter receiving means. When operated, the retaining edge is removed and set aside. The false bottom in the upper receptacle is removed along with the adhering wetted litter. The false bottom is vibrated, scraped, wiped, washed, or otherwise mechanically worked in order to remove the adhering litter for disposal. The upper receptacle is then moved back and forth, and to and fro to make the litter fall through the receptacle's aperture means into the lower receptacle-false bottom combination. Solid waste is retained in the upper receptacle and discarded. The cleaned false bottom is replaced into the cleaned receptacle. The receptacle-false bottom combination now containing the cleaned litter is nest-ably stacked into the reassembled just-cleaned combination. The retaining edge is pressed onto the peripheral shoulder of the now upper receptacle, litter added to replace that discarded during cleaning, and the litter-cleaning animal litter box is again ready for service.

This patent describes a very complicated litter-cleaning animal litter box. This is a complicated litter-cleaning device with an open top. Any time the top of a cat litter container has an open top it is impossible not to have the smell in the area. The cat litter does have a deodorant in it but it does not last long. The dried urine in the cat litter, even after it dries can still have a very unpleasant odor and eventually will still have to be removed and the device cleaned. With the Three-Piece Nesting Cat Litter Device not a great deal of cat litter is required and the litter and the solids drop directly into a plastic bag. The bag is removed and the device does not require a great deal of cleaning, if any.

U.S. Pat. No. 6,892,670 of Melaney Northrop, et al. describes a hood for a litter box for collecting cat excretions, the litter box includes a litter pan having an open top, a bottom wall, a rear wall, a front wall and a pair of sidewalls. A waste box is disposed adjacent the litter pan for storing cat excretions. The hood is disposed adjacent the litter pan to cover the litter pan open top. The hood includes a portion operable between first and second positions, such that in the first position, the portion overhangs the waste box to direct odors from the waste box into the hood, and in the second position, the portion allows access to the waste box without removing said hood.

This patent describes another complicated cat litter container with an open top. This patent allows the material to be stored in different areas but cannot completely eliminate the odor. There are several surfaces to be cleaned when this unit is serviced and it does not provide the plastic bag to protect the upper surfaces and a means for disposal. The non-stick paper on the Three-Piece Nesting Cat Litter Device under the cat litter maintains the cleanliness of the unit and the air filter odor eliminator sections keeps the odors within the enclosed device.

U.S. Pat. No. 3,752,120 of Sam W. Pallesi describes a litter box for use by cats, consisting of a series of three nesting containers, which may be enclosed by a removable hood shaped in the form of a house. The uppermost nesting container has a bottom of screen wire, with a pair of handholds in the side of the container. This container, when nested over the other two containers is, partially filled with sand. Each of the other two containers, with solid bottoms have projecting tabs along the side for use as handholds.

This patent describes a litter box for use by cats, consisting of a series of three nesting containers, which may be enclosed by a removable hood shaped in the form of a house. The upper structure has a front opening so that the odors can still circulate out and into the surrounding areas.

U.S. Pat. No. 5,121,712 of Benjamin M. Schulein Jr., et al. describes an animal litter box liner of flexible, sheet-like material is provided with holes of an appropriate size and location for allowing clean, dry litter to sift therethrough while simultaneously retaining clumps of urine-soiled litter and feces, within the liner as it is lifted from a litter pan.

This patent describes an animal litter box liner of flexible, sheet-like material with holes for allowing clean, dry litter to be reused. The reused cat litter still carries the odor of the urine.

U.S. Pat. No. 6,408,790 of Sara Barbara Maguire describes an animal litter box includes a litter tray for retaining a nonabsorbent litter that includes liquid permeable bottom means, preferably the bottom means defining a plurality of openings sized to allow the flow of liquid waste, but not the passage of litter. The litter tray fits into and is supported by a drain pan, the drain pan including an upstanding perimeter wall and a downwardly and inwardly sloping floor that includes a drain hole for the passage of liquid waste that has flowed through the litter tray liquid permeable bottom means. The liquid waste flows into and is collected by a reservoir drawer that is removably positioned within a base so that the liquid is captured by the reservoir drawer as it flows down the drain pan floor and through the drain pan hole. The base includes an upstanding perimeter support wall that has an opening for the placement and removal of the reservoir drawer and the base supports the drain pan within its perimeter wall. Alternatively, the drain pan and base are formed into a different base by the combination of the drain pan and the first base into an integral single unit, rather than a two piece combination.

This patent describes an animal litter box and includes a litter tray for retaining a nonabsorbent litter that includes liquid permeable bottom means. In this device the urine is kept in a liquid state to be held in a container. This will make the odors a greater problem where most conventional cat litters not only have a desiccant but have some deodorizing capability. This device does not make use of an air filter odor eliminator sections used in the enclosed area of the Three-Piece Nesting Cat Litter Device described in this application.

U.S. Pat. No. 5,855,186 of Knut H. Larsen describes A sanitization system for cat litter boxes is presented which is composed of a scoop device for straining cat litter where the scoop device has a handle member from which a scoop region extends axially. At a predetermined distance axially from the scoop region, a containment member extends laterally of the handle where the containment member has a multiplicity of venting orifices extending therethrough. A fluid reservoir is removably attachable to the cat litter box. The fluid reservoir is defined by a housing having an open end and a cavity chamber where the cavity chamber is so dimensioned and constructed to be in fluid communication with the open to permit the passage of fluid through the open end. A deodorizing and disinfectant fluid is carried in the reservoir. To seal the reservoir, the dimensions of the open end of the reservoir and of the containment member are substantially identical such that when the scoop is stored in the reservoir the containment member will seal it and permit deodorizing vapors to escape through the orifices. The system also includes a plastic bag holder which is defined by a frame having a multiplicity of suspension members from which the plastic bag may be suspended.

This patent describes a complicated sanitization system for cat litter boxes where most just use an open tray container with cat litter in it. It may be practical for a commercial operation but not for the average situation.

While the prior patents and prior art commercial devices have been successful to a certain extent, it is nonetheless clear that substantial room exists for affecting an advance in the art, which overcomes these shortcomings in a practical and efficient manner.

In this respect, before explaining at least one embodiment of the Three-Piece Nesting Cat Litter Device in greater detail, it is to be understood that the design is not limited in its application to the details of construction and to the arrangement of the components set forth in the following description or illustrated in the drawings. The Three-Piece Nesting Cat Litter Device is capable of other embodiments and of being practiced and carried out in various ways. Also, it is to be understood that the phraseology and terminology employed herein are for the purpose of description and should not be regarded as limiting.

SUMMARY OF THE INVENTION

The principle advantage of the Three-Piece Nesting Cat Litter Device is controlling the unpleasant odors encountered when using most of the other cat litter containers on the market.

Another advantage of the Three-Piece Nesting Cat Litter Device is where the solids and cat litter material falls into a plastic bag within the device for easily disposal without creating dust in the process.

Another advantage of the Three-Piece Nesting Cat Litter Device is that it enables a significant reduction of time and much less work required to clean and remove used cat litter than previous cat litter devices.

Another advantage of the Three-Piece Nesting Cat Litter Device is the use of one or more replaceable air filter odor eliminator sections in the door, the walls, or the top surface, of the enclosed area to filter out and remove undesirable smells.

Another advantage is being able to nest and stack the Three-Piece Nesting Cat Litter Devices for compact storage and shipping.

Another advantage of the Three-Piece Nesting Cat Litter Device is the clean appearance of the design, resembling a piece of furniture, that does not have to be kept out of sight, but can be placed in a home's living area.

Another advantage of the Three-Piece Nesting Cat Litter Device is that it is an enclosed area that the cats cannot scratch out the cat litter easily.

Yet another advantage of the Three-Piece Nesting Cat Litter Device is that it can be manufactured in a variety of different sizes.

And still another advantage of the Three-Piece Nesting Cat Litter Device is to create a device with transparent surfaces so that the cats using it do not have to be in a dark area to defecate.

A further advantage of the Three-Piece Nesting Cat Litter Device is to create a device that cats can have easy access in and out.

These together with other advantages of the Three-Piece Nesting Cat Litter Device along with the various features of novelty, which characterize the design are pointed out with particularity in the claims annexed to and forming a part of this disclosure. For a better understanding of the Three-Piece Nesting Cat Litter Device its operating advantages and the specific objects attained by its uses, reference should be made to the accompanying drawings and descriptive matter in which there are illustrated the preferred and alternate embodiments of the Three-Piece Nesting Cat Litter Device. There has thus been outlined, rather broadly, the more important features of the design in order that the detailed description thereof that follows may be better understood, and in odor that the present contribution to the art may be better appreciated. There are additional features of the Three-Piece Nesting Cat Litter Device that will be described hereinafter, and which will form the subject matter of the claims appended hereto.

With respect to the above description then, it is to be realized that the optimum dimensional relationships for the parts of the Three-Piece Nesting Cat Litter Device to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Three-Piece Nesting Cat Litter Device. Further, since numerous modifications and changes will readily occur to those skilled in the art, it is not desired to limit the Three-Piece Nesting Cat Litter Device to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Three-Piece Nesting Cat Litter Device and together with the description, serve to explain the principles of this application.

DETAILED DESCRIPTION OF THE PREFERRED EMBODIMENTS

As required, the detailed embodiments of the present Three-Piece Nesting Cat Litter Device 10A, 10B, 10C, 10D and 10E are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
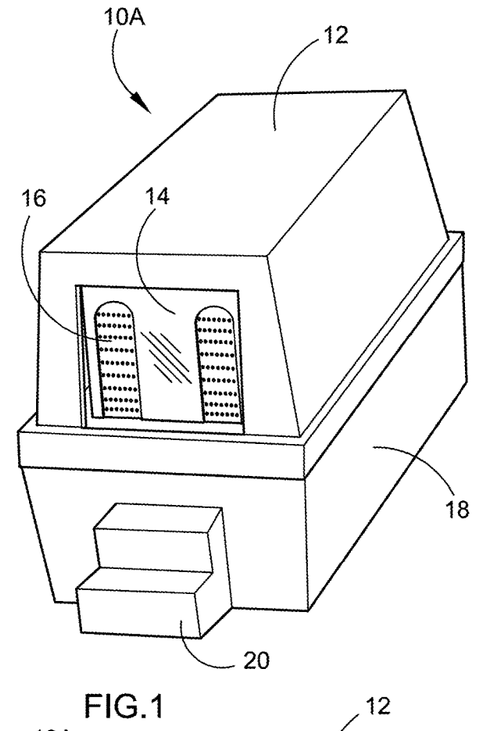
FIG. 1 depicts the preferred embodiment of the assembled, rectangular or square Three-Piece Nesting Cat Litter Device.

FIG. 1 depicts the preferred embodiment of the assembled, rectangular or square Three-Piece Nesting Cat Litter Device 10A where the upper section 12 has a transparent swinging flapper door 14 on one end that swings in and out that is equipped with a pair of air filter odor eliminator sections 16. The lower section 18 has optional steps 20.

Figure 2:
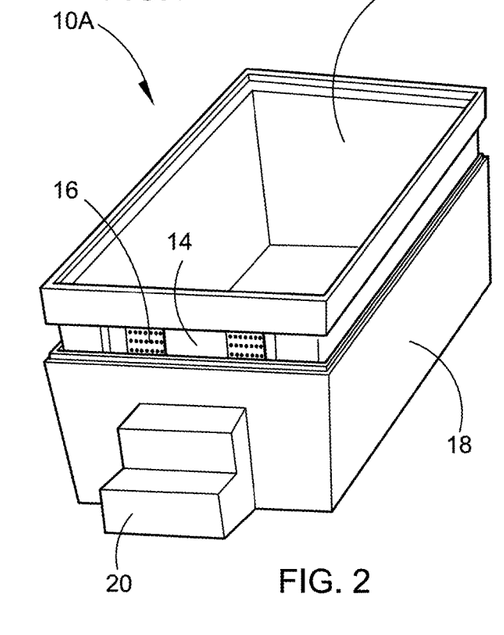
FIG. 2 depicts the preferred embodiment of the rectangular or square Three-Piece Nesting Cat Litter Device in the storage condition.

FIG. 2 depicts the preferred embodiment of the rectangular or square Three-Piece Nesting Cat Litter Device 10A in the storage condition illustrating the top section 12 with the air filter odor eliminator sections 16 in the swinging flapper doors 14. The top section 12 has been turned upside down and inserted for storage within the lower section 18 having the optional steps 20.

Figure 3:
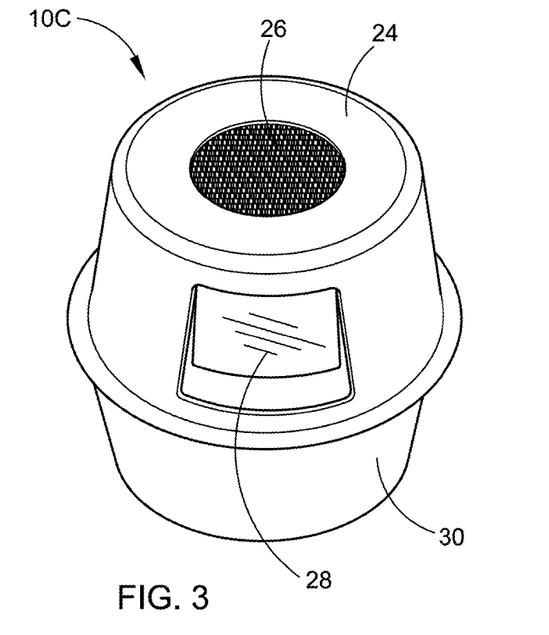
FIG. 3 depicts the forth alternate embodiment of the assembled round Three-Piece Nesting Cat Litter Device.

FIG. 3 depicts the second alternate embodiment of the assembled Three-Piece Nesting Cat Litter Device 10C with the round top section 24 having air filter odor eliminator sections 16 and a transparent swinging flapper door 28 that swings in and out. The Three-Piece Nesting Cat Litter Device 10C has a round flat bottom lower section 30.

Figure 4:
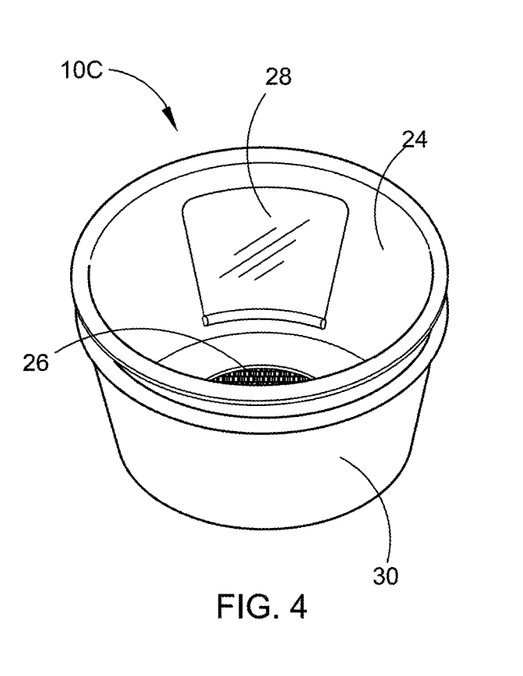
FIG. 4 depicts the forth alternate embodiment of the round Three-Piece Nesting Cat Litter Device in the storage condition.

FIG. 4 depicts the second alternate embodiment of the round Three-Piece Nesting Cat Litter Device 10C that is shown in the storage condition with the round top section 24 inverted and nested in the round flat bottom lower section 30.

Figure 5:
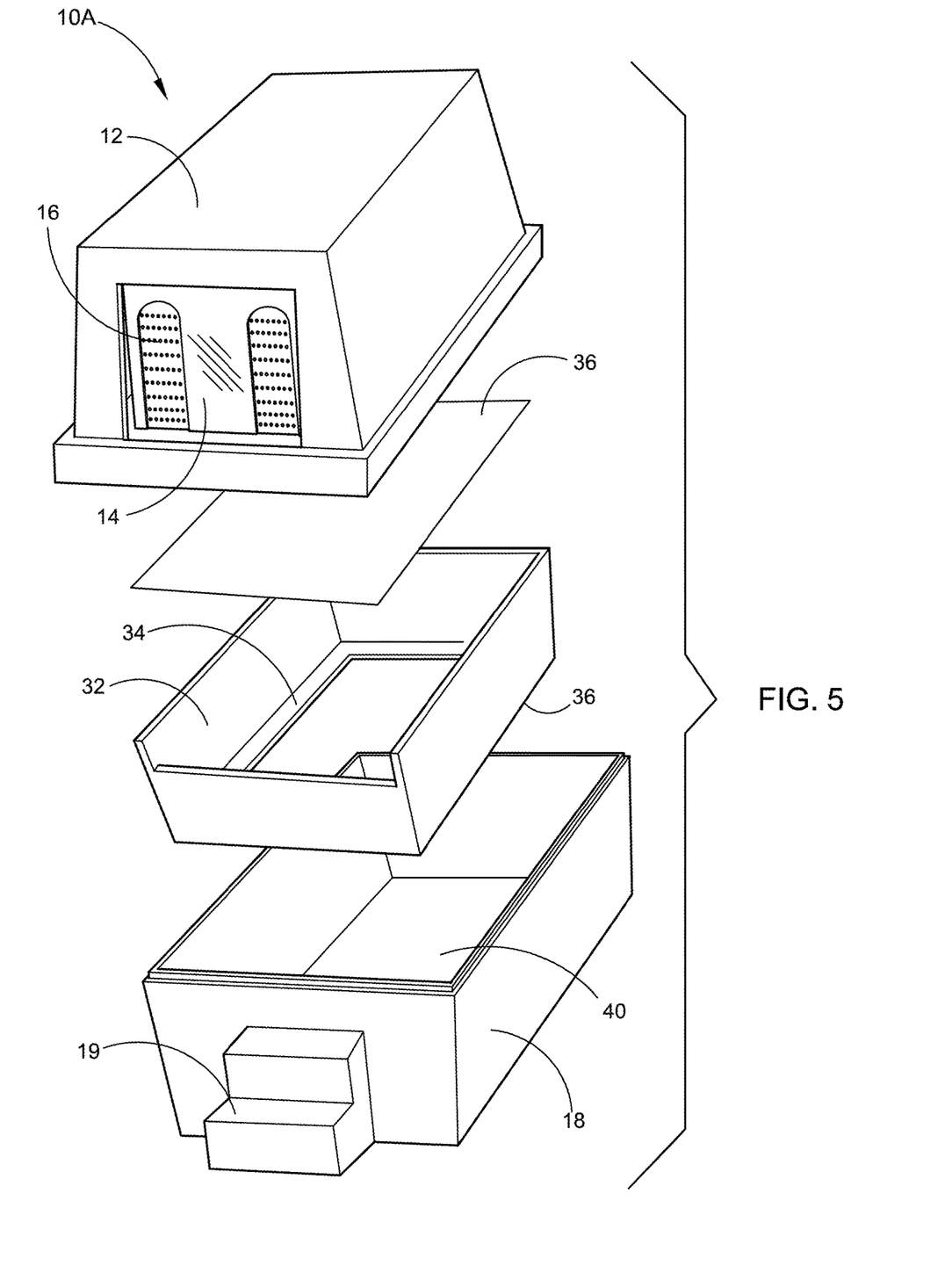
FIG. 5 depicts an exploded illustration of the assembled preferred embodiment of the rectangular or square Three-Piece Nesting Cat Litter Device.

FIG. 5 depicts an exploded illustration of the preferred embodiment of the rectangular or square Three-Piece Nesting Cat Litter Device 10A where the upper section 12 has a transparent swinging flapper door 14 on one end that swings in and out equipped with a pair of air filter odor eliminator sections 16. An insert rim bracket section 32 has a lower frame ledge 34 around the bottom edge 36 where a non-stick paper sheet 38 is placed in the insert rim bracket section 32 after it is on the bottom surface 40 of the Three-Piece Nesting Cat Litter Device 10A lower section 18. The lower section 18 has optional steps 20. Lower frame ledge 32 holds the non-stick paper sheet 38 in place and supports it when cat litter 54 is placed thereon. The non-stick paper sheet insert can be made from waxed paper, plastic coated paper, or the like.

Figures 6, 7:
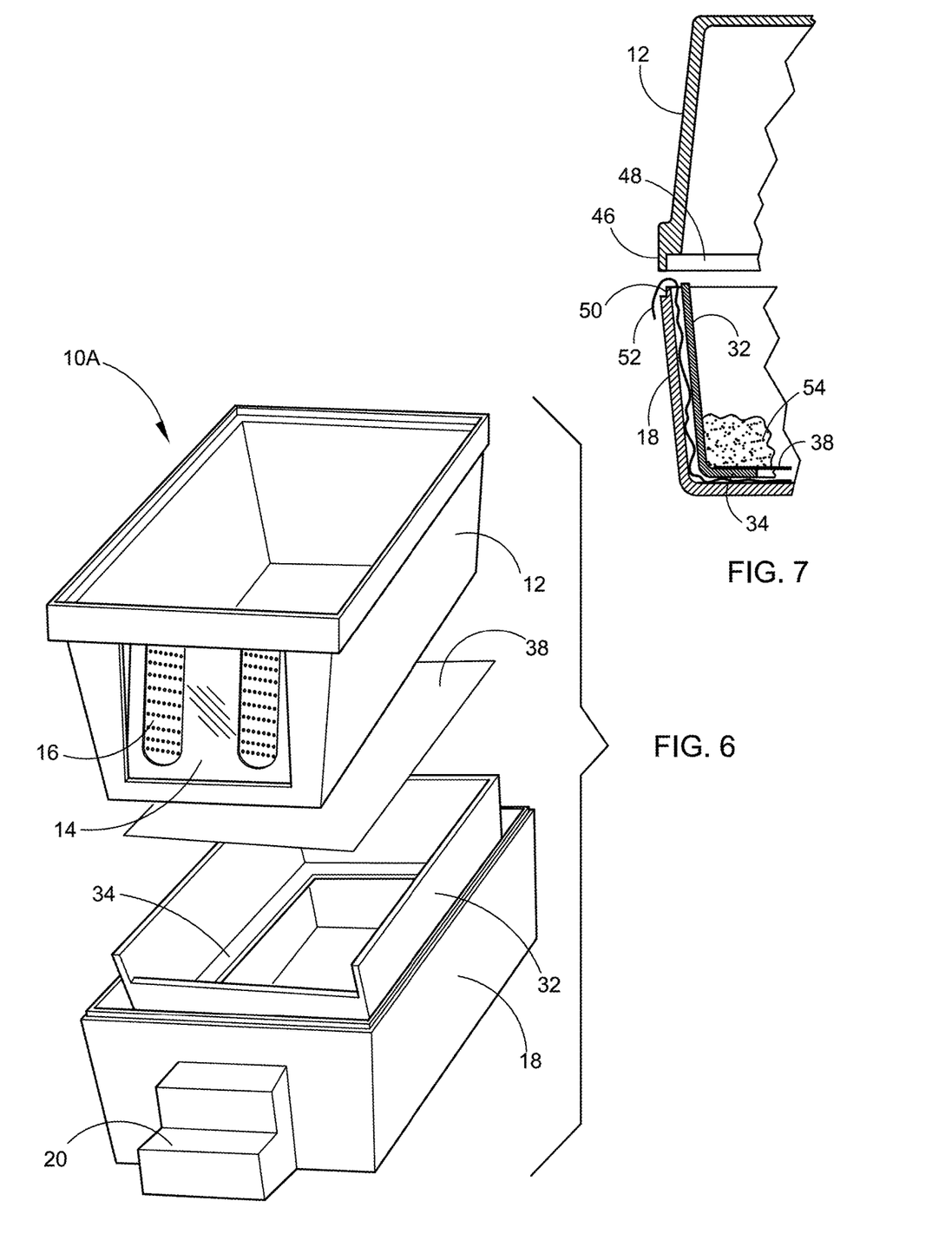
FIG. 6 depicts an exploded illustration of the preferred, embodiment of the rectangular or square Three-Piece Nesting Cat Litter Device in the storage condition.
FIG. 7 depicts a cross section of a typical side wall of the preferred embodiment of the rectangular or square Three-Piece Nesting Cat Litter Device.

FIG. 6 depicts an illustration of the preferred embodiment of the rectangular or square Three-Piece Nesting Cat Litter Device 10A where the upper section 12 has been inverted to be nested between the non-stick paper sheet 38 and the insert rim bracket section 32 and set into the lower section 18. The lower section 18 has optional steps 20.

FIG. 7 depicts a cross section of a typical side wall of the preferred embodiment of the rectangular or square Three-Piece Nesting Cat Litter Device 10A where upper section bottom edge 46 has a recessed mating surface 48 that mates with the stepped mating surface 50 at the top edge of the lower section 18. A plastic bag 52 has the cat litter 54 on top of the non-stick paper sheet 38 in the insert rim bracket section 32. When the insert rim bracket section 32 is lifted out the non-stick paper sheet and cat litter 54 will fall into the plastic bag 52 to be disposed of easily and conveniently without undue dust or odor creation.

Figures 8, 9:
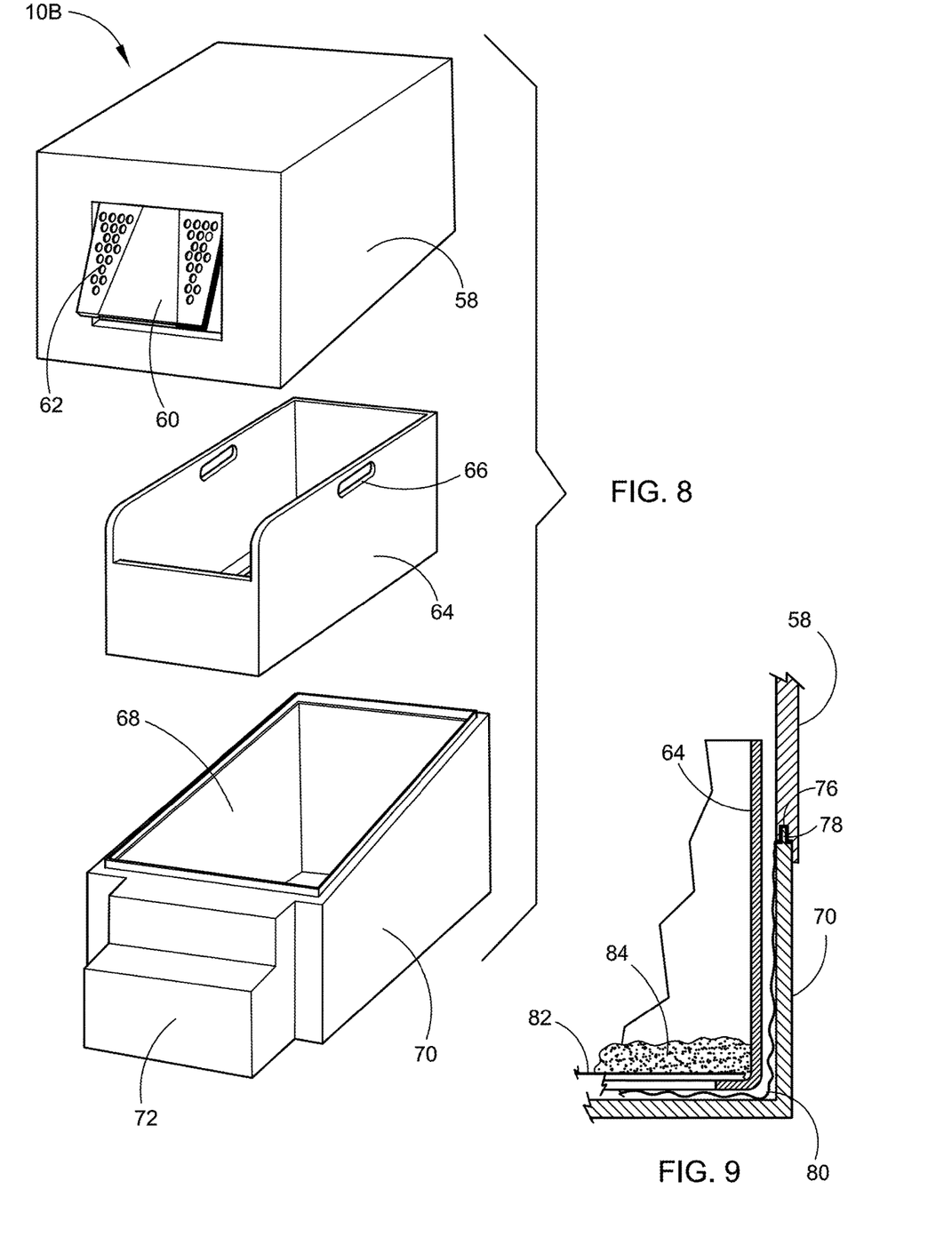
FIG. 8 depicts an exploded illustration of the first alternate embodiment rectangular or square Three-Piece Nesting Cat Litter Device.
FIG. 9 depicts a cross section through the side wall of the first alternate embodiment rectangular or square Three-Piece Nesting Cat Litter Device.

FIG. 8 depicts an exploded illustration of the first alternate embodiment rectangular or square Three-Piece Nesting Cat Litter Device 10B as a rectangular or square structure large enough to be piece of furniture or made small for a small cat. The unit consists of an upper section 58 with transparent swinging flapper door 60 on one end with two air filter air filter odor eliminator sections 62. The insert rim bracket section 64 has a lower frame ledge and handles 66 and will fit within the area 68 of the lower section 70. The lower section 70 has the optional steps 72.

FIG. 9 depicts a cross section through the bottom side wall of the first alternate embodiment rectangular or square Three-Piece Nesting Cat Litter Device 10B with the upper section 58 having a tongue 76 and groove 78 connection with the lower section 70. A plastic bag 80 lines the inside of the lower section 70 with the insert rim bracket section 64 having a lower frame ledge, forming it in place. A non-stick paper sheet 82 is under the cat litter 84 and falls through the insert 64 with the paper sheet 82 into the plastic bag 80 when the insert rim bracket section 64 is raised.

Figures 10, 11:
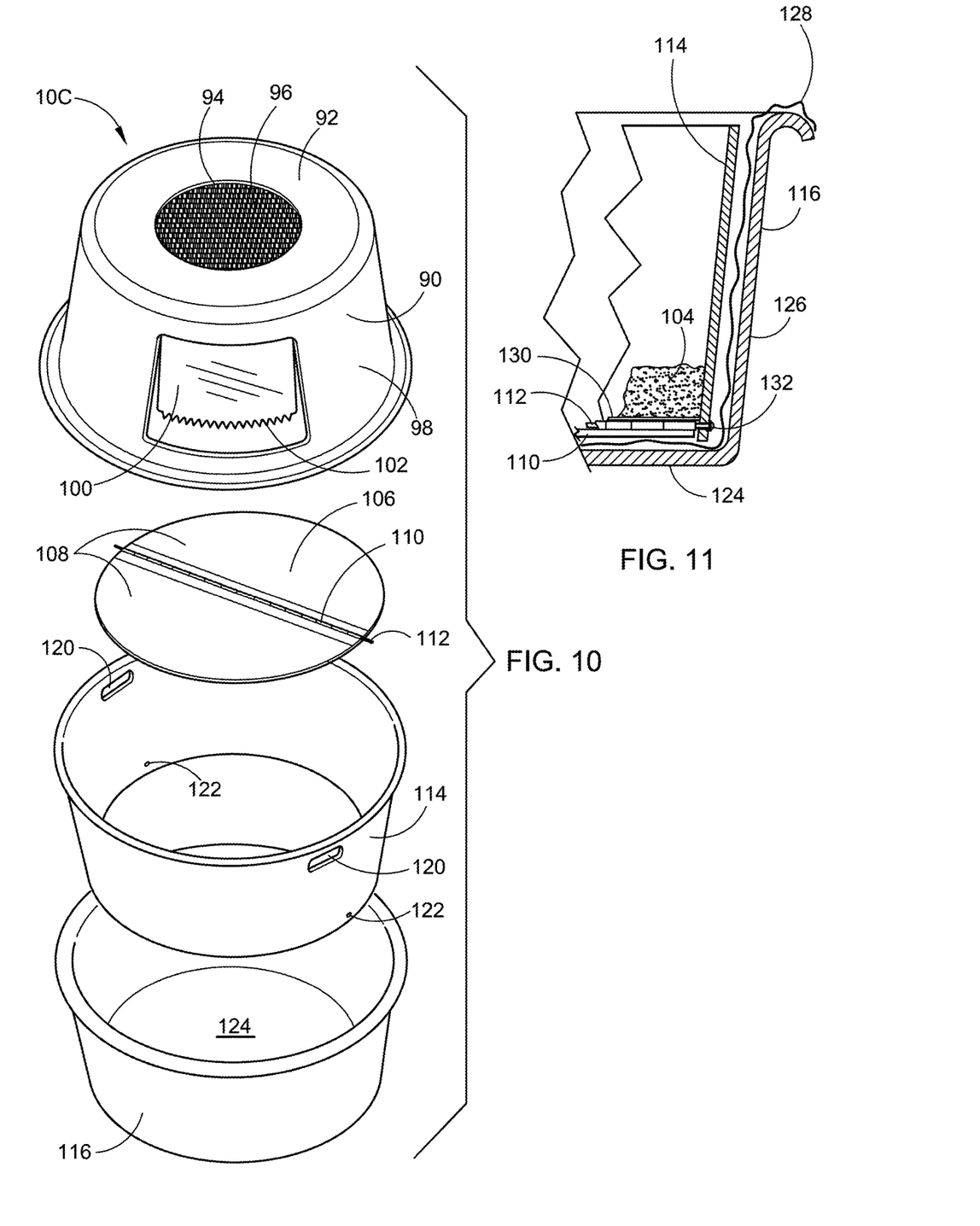
FIG. 10 depicts an exploded view of the second alternate embodiment of a round Three-Piece Nesting Cat Litter Device.
FIG. 11 depicts a cross section through the side wall of the second alternate embodiment of a round Three-Piece Nesting Cat Litter Device lower section.

FIG. 10 depicts an exploded view of the second alternate embodiment of a round Three-Piece Nesting Cat Litter Device 10C with a tapered cylindrical top section 90 with a flat top 92 having an orifice 94 with a transparent section or an air filter odor eliminator section 96. On the side 98 of the tapered cylindrical top section 90 is a transparent swinging flapper door 100 with a serrated edge 102 for the cats to rub on when they enter or exit the device. This serrated edge 102 acts like a comb, combing the cat's fur each time the cat exits and enters. A unique clamshell disk 106 with two sides 108 pivot by the means of hinge 110 down on shaft 112 to dump the cat litter 104 through the insert section 114 into the bottom section 116 when the insert section 114 is raised. The insert section 114 has two handles 120 and holes 122 on either side for the shaft 112 to pivot within. The tapered cylindrical bottom section 116 has a flat bottom 124.

FIG. 11 depicts a cross section through the side wall 126 of the second alternate embodiment of a round Three-Piece Nesting Cat Litter Device 10C with a straight bottom section 116. The insert section 114 is sitting on the plastic bag 128 on the flat bottom 124 with the two clamshell disks 106 held flat with the non-stick paper sheet 130 retaining the cat litter 104. When the insert section 114 is lifted the clamshell disks 106 fold down by the means of the hinge 110 and the shaft 112 that extend through the side wall 126 and secured by locking caps 132 on either end, and drops the cat litter 104 into the plastic bag 128. The non-stick paper sheet 130 is held folded over the hinge 110 to be used again.

Figures 12, 13, 14:
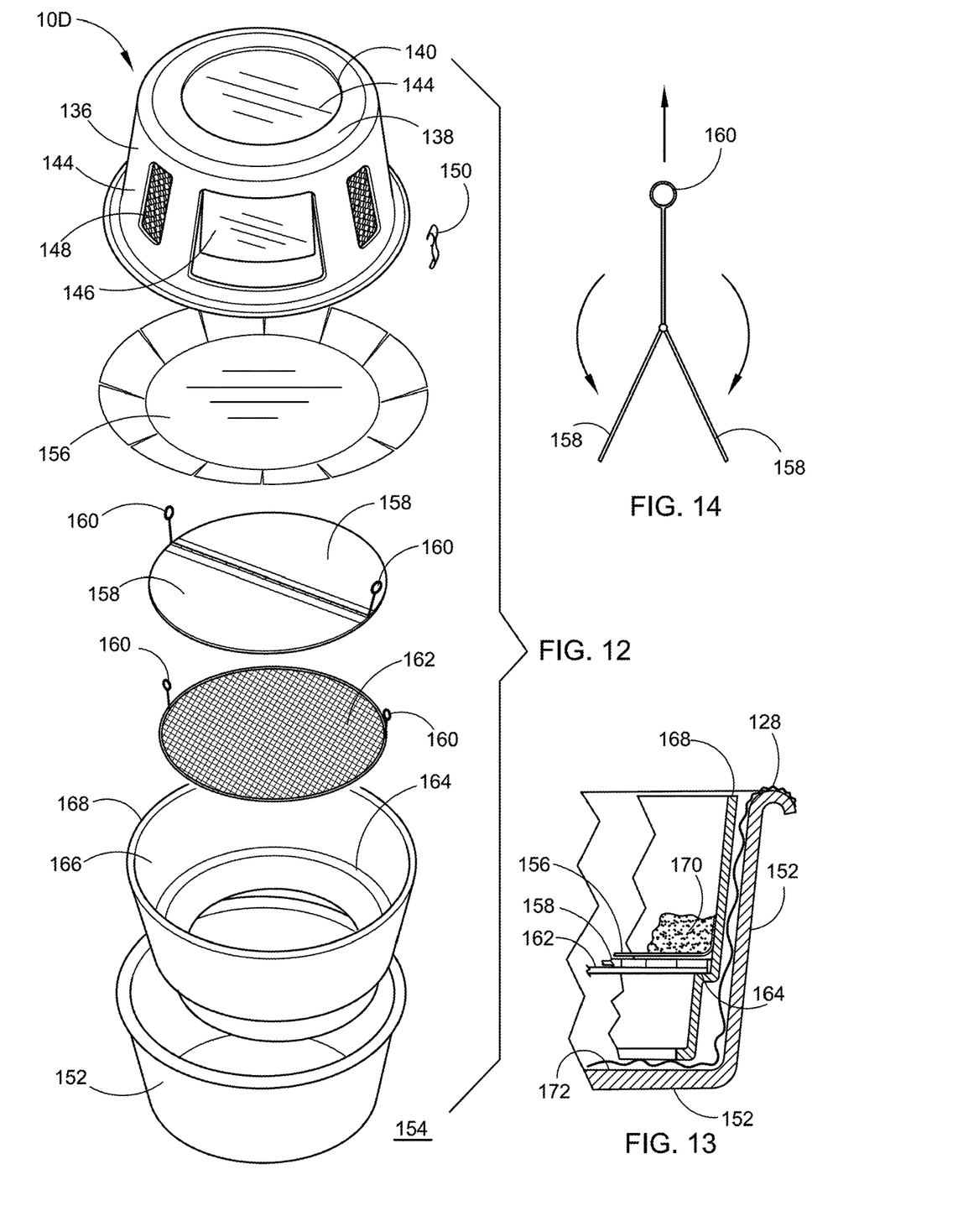
FIG. 12 depicts an exploded view of the third alternate embodiment of a round Three-Piece Nesting Cat Litter Device.
FIG. 13 depicts a cross section through the side wall of the third alternate embodiment of a round Three-Piece Nesting Cat Litter Device.
FIG. 14 depicts a front view of the Three-Piece Nesting Cat Litter Device clamshell disk assembly.

FIG. 12 depicts an exploded view of the third alternate embodiment of a round Three-Piece Nesting Cat Litter Device 10D with a tapered cylindrical top section 136 with a flat top 13S having an orifice 140 with a transparent portion 142. On the side 144 of the tapered cylindrical top section 136 is a transparent swinging flapper door 146. Two or more air filter odor eliminator sections 148 are on the side 144 of the tapered cylindrical top section 136. Two or more retainer clips 150 will be used to secure the top section 136 to the tapered cylindrical bottom section 152 with a flat bottom 154.

A precut sheet of non-stick paper 156 is placed over the hinged clamshell disk 158 with two lifting handles 160 rests on the filter screen disk 162 with two additional lifting handles 160. The filter screen disk 162 is supported by the means of a shelf 164 on the inner surface 166 of the insert 168. The bottom section 152 is shown with the flat bottom 154. When the device needs to be cleaned the top section 136 is removed and the clamshell disk 106 is raised by the means of the two lifting handles 160 and the dry cat litter passes through the filter screen disk 162 into the bottom section 152 and the solids remain on the filter screen disk 162 to be disposed of during the cleaning process.

FIG. 13 depicts a cross section through the side wall of the third alternate embodiment of a round Three-Piece Nesting Cat Litter Device 10D illustrating the insert section 168 sitting on the plastic bag 128 on the bottom of the bottom surface 172 of the bottom section 152. The clamshell disk 158 with the non-stick paper sheet 156 on top is supported by the means of the filter screen disk 162 on the shelf 164 portion of inner section 168. When the clamshell disk 158 is raised by the means of the lifting handles 160 the dry cat litter passes through the filter screen disk 162 into the bottom section 152 and the solids remain on the filter screen disk 162 to be disposed of.

FIG. 14 depicts a side edge view of the Three-Piece Nesting Cat Litter Device clamshell 158 folding device handle 160. The handle 160 has a ring at the top for gripping, and is attached to the hinge at its center portion and at the ends of the hinge linking the two halves of the clamshell disk 158. When the handle is lifted, the clamshell folds downward releasing the litter by gravity from the non-stick paper 156 onto the screen 162.

Figures 15, 16, 17:
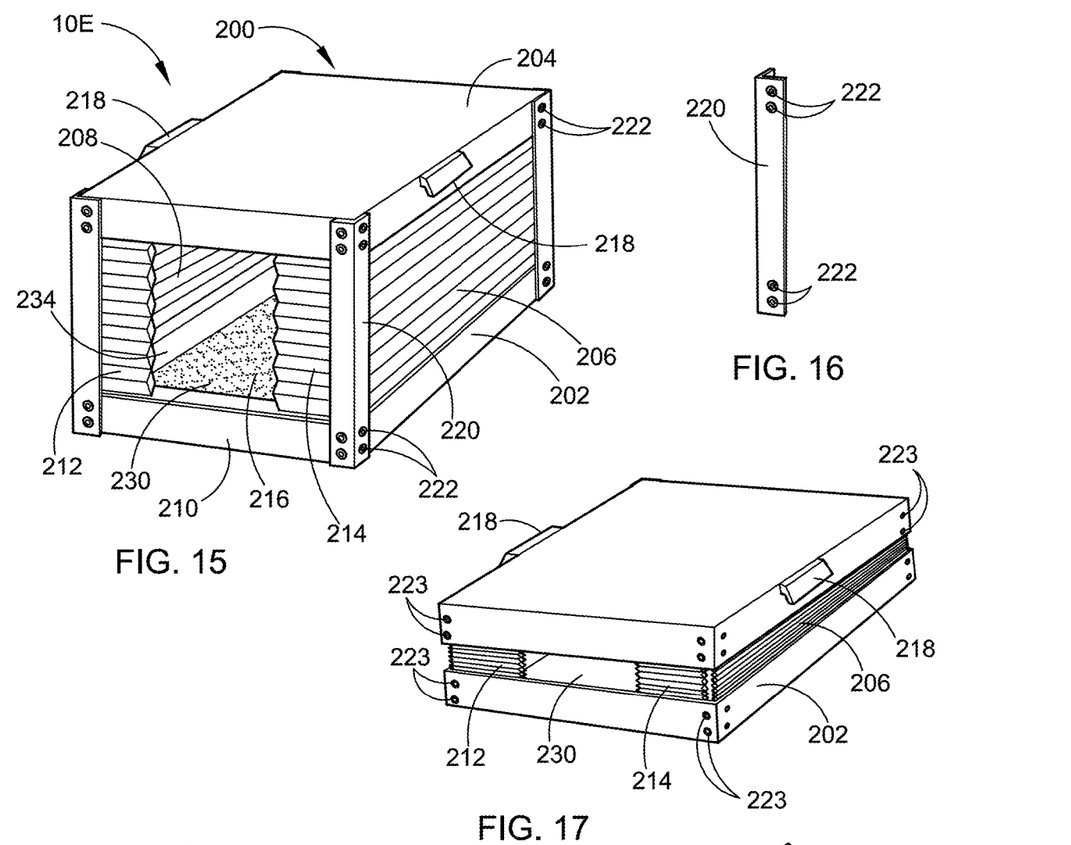
FIG. 15 depicts a top, front and side perspective view of the Three-Piece Nesting Cat Litter Device having a collapsible upper cover piece, support pieces and a lower tray piece.
FIG. 16 depicts a front view of the support piece as seen assembled in FIG. 15 above.
FIG. 17 depicts a top, front and side perspective view of the Three-Piece Nesting Cat Litter Device with the support pieces removed and the upper piece collapsed down for packaging or storage when not in use.
Figure 18:
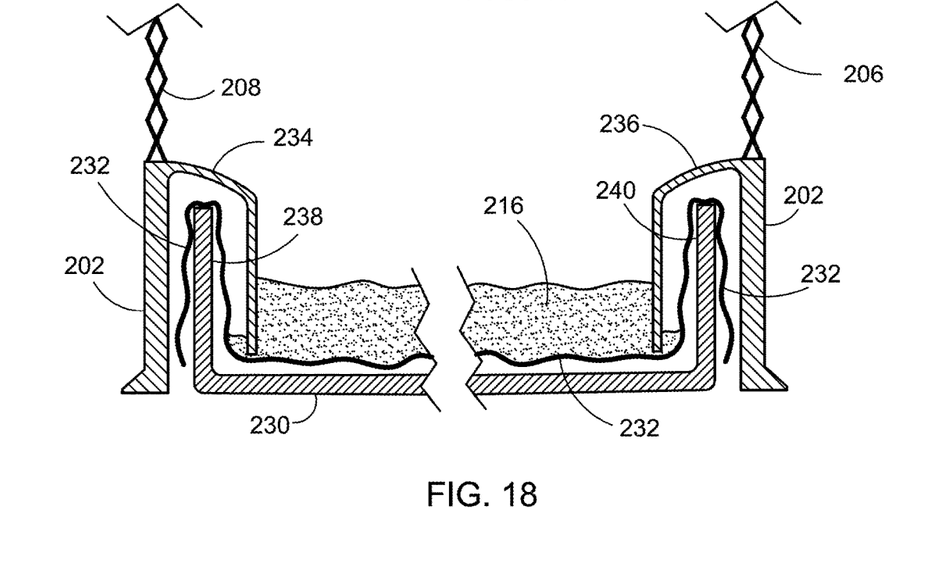
FIG. 18 depicts a cross sectional view of the Three-Piece Nesting Cat Litter Device illustrating the upper collapsible piece in place over the lower tray piece.

FIG. 15 depicts a top, front and side perspective view of the Three-Piece Nesting Cat Litter Device 10E having a collapsible upper cover piece 200, support pieces 220 fitted into each corner of collapsible upper cover piece 200, and a lower tray piece (not shown) which contains the cat litter material (see FIG. 18). The collapsible upper cover piece 200 is constructed of a lower flame 202, and upper flame 204, collapsible side walls 206 and 208, and two collapsible front walls, namely, collapsible left front wall 212 and collapsible right front wall 214 which define a front opening for the pet to enter the Three-Piece Nesting Cat Litter Device 10E. The collapsible upper cover piece 200 is extended using handles 218 and then placed over the lower tray which contains the cat litter material 216.

FIG. 16 depicts a front view of the support piece 220 as seen assembled and snapped into place on the corners of the Three-Piece Nesting Cat Litter Device 10E having a collapsible upper cover piece 200 shown in FIG. 15 above. Each support piece 220 has two upper male snaps 222 and two lower male snaps which match up with and snap into the female snaps 223 located in the lower frame 202 and the upper frame 204 of the collapsible upper cover piece 200. When snapped into place and securely fastened, the support members 220 in each corner of the collapsible upper cover piece 200 act to keep the upper frame 204 from lowering down while the Three-Piece Nesting Cat Litter Device 10E is in use.

FIG. 17 depicts a top, front and side perspective view of the Three-Piece Nesting Cat Litter Device 10E illustrating the collapsible upper cover piece 200 collapsed down for packaging or storage when not in use. FIG. 17 shows the collapsible upper cover piece 200 collapsed down, the collapsible side walls 206 and 208 collapsed down, and the two collapsible front walls, namely, collapsible left front wall 212 and collapsible right front wall 214 collapsed down, which define a front opening 230. When the Three-Piece Nesting Cat Litter Device 10E is fully collapsed down in the state shown here in FIG. 17, it is efficiently packaged into a more compact form, and it likewise takes less space when transported and stored when not in use.

FIG. 18 depicts a cross sectional view of the Three-Piece Nesting Cat Litter Device 10E illustrating the upper collapsible piece 200 in place over the lower tray piece 230. The lower tray piece includes the lining bag 232 which lines the lower tray piece 230 and contains the cat litter material 216 within the lower tray piece 230. The upper collapsible piece 200, which includes the collapsible walls 206 and 208, form a pair of integral lining bag, retaining wall portions 236 and 238 on the left and right sides, respectively, of the lower frame 202. These integral lining bag retaining wall portions 236 and 238 act to hold the lining bag 232 securely in place when the lining bag 232 is wrapped over both of the side walls 238 and 240 of the lower tray piece 230. The inner walls of the integral lining bag retaining wall portions 236 and 238 are sloped to allow cat litter material 216 to slide off should any cat litter material 216 be thrown onto the integral lining bag retaining wall portions 236 and 238. In operation, to change the old cat litter material 216, the upper collapsible piece 200 is removed from over the lower tray piece 230 and the lining bag 232, containing the used cat litter material, is wrapped up and removed to be disposed of. A new lining bag 232 is then placed into the lower tray piece 230 and new replacement cat litter material 216 is placed into the lower tray 230 over the lining bag 232. Lastly, the upper collapsible piece 200 is placed over the lower tray piece such that the integral lining bag retaining wall portions 236 and 238 retain the lining bag within the lower tray 230.

The Three-Piece Nesting Cat Litter Device 10A, 10B, 10C, 10D and 10E shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Three-Piece Nesting Cat Litter Device 10A, 10B, 10C, 10D and 10E in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described, herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular odor, such operations need not be performed in the particular odor shown or in sequential odor, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A three-piece nesting cat litter device, comprising:
   (a) an upper cover piece top section having an opening for entry;
   (b) a lower tray piece bottom section configured to support a disposable plastic bag and to contain cat litter material; and
   (c) a middle interior frame piece insert section having an upper portion and a lower portion including a ledge section located on said lower portion, wherein said ledge section is configured to support a non-stick paper sheet;
   wherein a disposable plastic bag is, placed within said lower tray piece, said middle interior frame piece with said ledge section is nested within said lower tray piece by being placed over the top of said disposable plastic bag, and said non-stick paper sheet is placed within said middle interior in contact with said ledge section, cat litter material is placed on said non-stick paper sheet, and said upper section is placed on said lower section thereby providing a covering for both said middle interior frame piece and said lower tray piece.

2. The three-piece nesting cat litter device according to claim 1, wherein said upper cover piece top section includes a door.

3. The three-piece nesting cat litter device according to claim 2, wherein said door includes a swinging flapper door.

4. The three-piece nesting cat litter device according to claim 3, wherein said swinging flapper door includes one or more integral air filter odor eliminator sections.

5. The three-piece nesting cat litter device according to claim 3, wherein said swinging flapper door is transparent.

6. The three-piece nesting cat litter device according to claim 1, wherein said upper cover piece top section includes integral air filter odor eliminator sections.

7. The three-piece nesting cat litter device according to claim 1, wherein said upper cover piece top section includes transparent sections.

8. The three-piece nesting cat litter device according to claim 1, wherein said middle interior frame piece insert includes handles.

9. The three-piece nesting cat litter device according to claim 1, further including a clamshell disk having handles, which rests on said middle interior frame piece insert section upon said ledge section.

10. The three-piece nesting cat litter device according to claim 1, further including a filter screen disk having handles, which rests on said middle interior frame piece insert section upon said ledge section.

11. A method for making a three-piece nesting cat litter device, comprising the steps of:
    (a) providing an upper cover piece top section having an opening for entry;
    (b) providing a lower tray piece bottom section configured to support a disposable plastic bag and to contain cat litter material; and
    (c) providing a middle interior frame piece insert section having an upper portion and a lower portion including a ledge section located on said lower portion, wherein said ledge section is configured to support a non-stick paper sheet;
    wherein a disposable plastic bag is placed within said lower tray piece, said middle interior frame piece with said ledge section is nested within said lower tray piece by being placed over the top of said disposable plastic bag, and said non-stick paper sheet is placed within said middle interior in contact with said ledge section, cat litter material is placed on said non-stick paper sheet, and said upper section is placed on said lower section thereby providing a covering for both said middle interior frame piece and said lower tray piece.

12. The method of making a three-piece nesting cat litter device according to claim 11, wherein said upper cover piece top section includes a door.

13. The method of making a three-piece nesting cat litter device according to claim 12, wherein said door includes a swinging flapper door.

14. The method of making a three-piece nesting cat litter device according to claim 13, wherein said swinging flapper door includes one or more integral air filter odor eliminator sections.

15. The method of making a three-piece nesting cat litter device according to claim 13, wherein said swinging flapper door is transparent.

16. The method of making a three-piece nesting cat litter device according to claim 11, wherein said upper cover piece top section includes integral air filter odor eliminator sections.

17. The method of making a three-piece nesting cat litter device according to claim 11, wherein said upper cover piece top section includes transparent sections.

18. The method of making a three-piece nesting cat litter device according to claim 11, wherein said middle interior frame piece insert includes handles.

19. The method of making a three-piece nesting cat litter device according to claim 11, further including a clamshell disk having handles, which rests on said middle interior frame piece insert section upon said ledge section.

20. The method of making a three-piece nesting cat litter device according to claim 11, farther including a filter screen disk having handles, which rests on said middle interior frame piece insert section upon said ledge section.

\* \* \* \* \*